United States Patent

Weil

[15] 3,666,712

[45] May 30, 1972

[54] FLAME RETARDANT POLYMETHYL METHACRYLATE COMPOSITIONS

[72] Inventor: Edward D. Weil, Hastings-on-Hudson, N.Y.

[73] Assignee: Stauffer Chemical Company, New York, N.Y.

[22] Filed: Apr. 6, 1970

[21] Appl. No.: 26,050

Related U.S. Application Data

[63] Continuation-in-part of Ser. No. 463, Jan. 2, 1970, abandoned.

[52] U.S. Cl. ..........................260/45.7 P, 106/15 FP, 252/8.1
[51] Int. Cl. ..............................................................C09k 3/28
[58] Field of Search ...............................260/45.7 P, 933, 963

[56] References Cited

UNITED STATES PATENTS

| | | |
|---|---|---|
| 3,347,818 | 10/1967 | Howe........................................260/41 |
| 3,456,022 | 7/1969 | Wright......................................260/648 |
| 3,294,730 | 12/1966 | Jukes.......................................260/30.6 |
| 3,445,404 | 5/1969 | Ronden et al............................260/2.5 |
| 3,283,013 | 11/1966 | Rimmer....................................260/633 |
| 3,030,327 | 4/1962 | Hosch.....................................260/30.6 |
| 3,001,954 | 9/1961 | Buchholz et al. .........................260/2.5 |

*Primary Examiner*—Donald E. Czaja
*Assistant Examiner*—R. A. White
*Attorney*—Wayne C. Jaeschke and Martin Goldwasser

[57] ABSTRACT

Self-extinguishing homo- and copolymers of methyl methacrylate (MMA) are prepared by the intimate admixture of the latter polymers with a specified 2,3-dibromopropyl acid phosphate ester. The thus treated polymers display a high degree of flame retardance without any diminution of their clarity or hardness and they may be safely employed in any application requiring their possible exposure to fire.

5 Claims, No Drawings

FLAME RETARDANT POLYMETHYL METHACRYLATE COMPOSITIONS

RELATED APPLICATION

This application is a continuation-in-part of application Ser. No. 463, filed Jan. 2, 1070, now abandoned.

BACKGROUND OF THE INVENTION

Polymethyl methacrylate (PMMA) and copolymers of MMA with minor proportions of one or more ethylenically unsaturated monomers are hard, optically clear, thermoplastic polymers which are widely utilized for the preparation of such diverse articles as lenses, aircraft canopies, windows, windshields, lighting fixtures and advertising displays. As normally prepared, these polymers are materials which will ignite and continue to burn upon exposure to flames. However, in many instances, particularly where they are being considered for use in building interiors, it is highly desirable that these homo- and copolymers of MMA should display flame retardant properties so that they may conform to various building codes which require a substantial degree of fire or flame retardancy for interior building materials.

Prior attempts to provide flame retardant homo- and copolymers of MMA have involved the use of a variety of additives including certain tris (halogenated alkyl) phosphates or phosphonates. However, the effective utilization of these phosphate esters required their presence in rather high concentrations which adversely affected the physical properties of the treated polymers. Thus, the clarity and especially the hardness of the polymers were particularly prone to deterioration in the presence of the high concentrations of these phosphates or phosphonates which were necessary to achieve a self-extinguishing polymer composition.

It is, therefore, the prime object of this invention to provide a means of preparing flame retardant polymers of MMA which will not adversely affect their inherent hardness and clarity. Various other objects and advantages of this invention will be apparent from the disclosure thereof which follows hereinafter.

TECHNICAL DISCLOSURE OF THE INVENTION

It has now been discovered that the use of certain 2,3-dibromopropyl acid phosphate esters as additives for homo- and copolymers of MMA provides the thus treated polymers with a high degree of flame retardance. Surprisingly, these additives have been found to be fully effective at relatively low concentrations with the result that there are no serious deleterious effects upon any of the significant physical properties, and particularly the clarity and hardness, of the thus treated polymers.

The 2,3-dibromopropyl acid phosphate esters capable of functioning as flame retardancy additives for PMMA in the manner here described include: mono-2,3-dibromopropyl acid phosphate, i.e.,

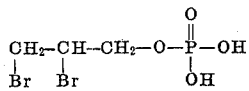

bis (2,3-dibromopropyl) acid pyrophosphate, i.e.,

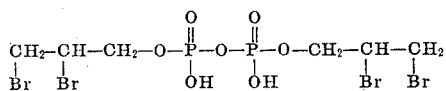

and 2,3-dibromopropyl methyl acid phosphate, i.e.,

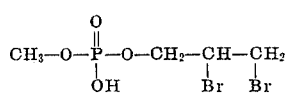

and mixtures of any two or more of the latter esters. It is to be noted that 2,3-dibromopropyl methyl acid phosphate is a new composition of matter.

Also applicable for use in the process of this invention are mixtures containing at least about 30 mole percent of one or more of the above listed 2,3-dibromopropyl acid phosphate esters in combination with one or more phosphate esters which, if used alone, would be inoperative as flame retardant additives for homo-and copolymers of MMA. For example, mono-2,3-dibromopropyl acid phosphate is often prepared as part of a mixture with di-(2,3-dibromopropyl) acid phosphate and such mixtures are suitable for use in the process of this invention provided that the mono ester is present in said mixtures in a concentration of at least about 30 mole percent. The product of 3 molar equivalents of 2,3-dibromopropanol with 1 molar equivalent of phosphorus pentoxide, said product containing at least about 30 mole percent of mono-2,3-dibromopropyl acid phosphate together with bis-(2,3-dibromopropyl) acid phosphate is also useful in the process of the invention. However, the mono-2,3-dibromopropyl acid phosphate is far more efficacious when used in mixtures where it is present in a concentration greater than about 30 mole percent.

Still more effective, and having the important advantage of lower color, is the product obtained by reacting (3−X) molar equivalents of 2,3-dibromopropanol and X molar equivalents of methanol with 1 molar equivalent of phosphorus pentoxide, (where X has a value of from about 0.1 to about 1.6). These beneficial effects, with respect to reduced coloration and enhanced flame retardance, which are attained by replacing some of the dibromopropyl groups by methyl groups in these phosphate acid esters is surprising and unexpected and no explanation can be offered for this phenomenon. Optimum results, with respect to this group of mixed methyl dibromopropyl phosphates is the mixture containing at least about 30 mole percent of 2,3-dibromopropyl methyl acid phosphate with mono-2,3-dibromopropyl acid phosphate as made by addition of 1 molar equivalent of methanol to 1 molar equivalent of bis-2,3-dibromopropyl acid pyrophosphate.

The above listed phosphate esters may be prepared by means of reactions known to those skilled in the art. Thus, bis(2,3-dibromopropyl) acid pyrophosphate can be made by the reaction of phosphorus pentoxide with 2,3-dibromopropanol; while a mixture of mono-2,3-dibromopropyl acid phosphate and 2,3-dibromopropyl methyl acid phosphate can be made by reacting methanol with bis(2,3-dibromopropyl) acid pyrophosphate.

It is quite surprising to find that such closely related phosphate esters, with respect to the above specified group of compounds, as bis-(dibromopropyl) acid phosphate; tris-(2,3-dibromopropyl) phosphate; and, mixtures of mono- and di- (2,3-dibromopropyl) acid phosphate wherein the di-ester is present in a concentration greater than 30 mole percent are found to be unsatisfactory as flame retardant additives for MMA polymers. Thus the effective use of the latter compounds requires their presence in high concentrations which adversely affect the clarity and hardness of the thus treated PMMA.

In utilizing the above described phosphate esters as flame retardant additives for MMA polymers, they may be incorporated directly into the polymerization recipe, i.e., the mixture of a catalyst with methyl methacrylate monomer along with any other desired vinyl monomers, that is utilized for the preparation of the MMA polymer or copolymer by means of a bulk, or solvent free, polymerization process. Applicable catalysts include azobisisobutyronitrile, benzoyl peroxide and lauroyl peroxide.

Alternatively, the selected phosphate ester may be intimately admixed with a previously prepared, partially polymerized "syrup" of MMA or of a mixture of MMA with one or more vinyl comonomers prior to the casting of the syrup. These syrups comprise an MMA homo- or copolymer dissolved in the unpolymerized MMA or in the unpolymerized mixture of MMA with one or more vinyl comonomers of which said polymer is composed. The thus treated syrup is then cast into a mold where its polymerization is completed. In addition, the phosphate ester additive may be admixed with a solid sample of the MMA polymer at such time as the latter is to be subjected to a milling, extruding, calendering, molding or other converting operation prior to its being put into the form or shape in which it will ultimately be utilized.

With respect to proportions, the phosphate ester may be present in the final MMA polymer-phosphate ester blend in a concentration of from about 2 to 30 percent, as based on weight of the polymer, the exact level depending on the degree of flame retardancy required. Within the latter limits, the resulting product will display excellent flame retardant properties without serious reduction in either the clarity or hardness of the polymer. Optimum results are, however, attained by the use of the phosphate ester in a concentration of about 5–25 percent as based on the weight of the MMA polymer.

In addition to PMMA, the above specified phosphate esters may also be used to provide flame retardant properties for copolymers of methyl methacrylate with minor proportions of one or more alpha, beta-ethylenically unsaturated monomers including: the $C_1$–$C_8$ alkyl, cycloalkyl and bicycloalkyl esters of acrylic acid and the $C_2$–$C_8$ alkyl, cycloalkyl and bicycloalkyl esters of methacrylic acid such, for example, as ethyl acrylate and methacrylate, butyl methacrylate, ethylhexyl methacrylate, norbornyl acrylate, and cyclohexyl acrylate; vinyl aryl compounds such, for example, as alpha-methyl styrene and styrene; and, nitriles of alpha, beta-ethylenically unsaturated carboxylic acids such, for example, as acrylonitrile, methacrylonitrile and alpha-chloroacrylonitrile. From the above given group, the use of the $C_1$–$C_8$ alkyl esters of acrylic acid and of the $C_2$–$C_8$ alkyl esters of methacrylic acid is preferred.

Moreover, the PMMA-phosphate ester blends of this invention may, if desired, include various optional additives therein including, for example, ultra-violet screening agents such as hydroxybenzophenones; mold release agents such as stearic acid; and, plasticizers such as the dialkyl phthalate and the aryl phosphate esters in order to lower heat distortion temperatures. The compositions may also contain pigments, dyes, opacifying agents, decorative additives such as reflective metal foils or flakes, and other imbedded solid objects such as glass cloth or fibers, paper, and the like. In addition, the compositions may contain other flame retardants such as halogenated alkyl phosphates or phosphonates, alkyl acid phosphates, or small concentration of phosphoric acid.

The flame retardant homo- and copolymers of MMA resulting from the process of this invention may be put into the form of panels, sheets, rods, tubes, films and shaped articles, etc. by means of converting procedures well known to those skilled in the art. They are particularly useful in interior applications requiring the use of fire resistant materials such, for example, as lighting fixtures wherein the normal clarity and hardness of the MMA polymer must be retained.

In addition to being blended with homo- and copolymers of MMA, the acid phosphate compositions of the invention can also be utilized as flame retardant additives for various other thermoplastic and thermoset polymers, elastomers, and other combustible substrates. For example, these compositions are useful as flame retardant additives for polyesters, both cured and uncured; polystyrene; polyolefins; acrylonitrile-styrene-butadiene copolymers and other styrene copolymers and polyblends; natural and synthetic rubber; phenolic resins; urea/formaldehyde resins; melamine/formaldehyde resins; epoxy resins, diallyl phthalate resins; vinyl resins; polyarylene oxides; polyamides; polycarbonates; polysulfones; and cellulosics such as paper, wood, fiberboard, cellulose acetate, cotton, rayon, and the like.

In the phenolic, epoxy, melamine/formaldehyde, and urea/formaldehyde resins the acid phosphate compositions of this invention may serve in the double role of flame retardant additives and as acid catalysts and/or reactants to aid in the curing of the resin. In systems where an acidic material may be objectionable, the acid phosphates may be neutralized by a nitrogen base, such as ammonia, an amine, melamine or basic derivative thereof or urea or a basic derivative thereof, generally without loss of flame retardant activity or even with enhancement thereof. Such neutralized compositions are especially suitable for cellulosic substrates. In some systems such as rubber, the acid phosphates may be rendered neutral by salt formation with antimony, calcium, zinc, lead or other metals, conveniently introduced into the system as the oxide or carbonate.

Although the methyl ester is the preferred embodiment of the invention, other lower alkyl ($C_2$–$C_4$) dibromopropyl acid phosphates are workable, for example ethyl, propyl, and butyl 2,3-dibromopropyl acid phosphates are found to be effective in the process and products of the invention.

The following examples will further illustrate the embodiment of this invention. In these examples, all parts given are by weight unless otherwise noted.

EXAMPLE I

This example illustrates the preparation of a flame retardant PMMA composition by means of the process of this invention. It also provides a comparison with the results obtained with phosphate esters other than those specified as applicable for use in this process.

A number of different batches of PMMA were polymerized, by means of a conventional bulk polymerization procedure, in the presence, respectively, of the following phosphate esters: (1) mono-2,3-dibromopropyl acid phosphate; (2) a mixture containing mono- and di- (2,3-dibromopropyl) acid phosphate in a 1:1 molar ratio; and, (3) di-(2,3-dibromopropyl) acid phosphate, the latter ester being inapplicable for use in the process of this invention. The bulk polymerization procedure which was utilized involved dissolving the desired concentration of the phosphate ester or ester mixture in methyl methacrylate monomer containing 100 PPM OF azobisisobutyronitrile dissolved therein. The resulting solutions were poured into tubular molds and then heated to a temperature of about 80° C. The polymerization was allowed to proceed for a period of about 3 hours yielding solid polymer rods having a diameter of 10mm. Each batch of the thus polymerized PMMA rods contained its respective phosphate ester or ester mixture in a concentration of 6 percent, as based on the weight of the PMMA.

It was noted that all of these rods displayed excellent hardness and clarity except that the rods containing the inapplicable di-(2,3-dibromopropyl) acid phosphate had an orange-brown coloration. The flame retardancy of these rods was then evaluated by igniting them, while in a horizontal position, with a gas burner and noting the amount of time required for the resulting flames to be extinguished. Thus, it was observed that: (1) the PMMA rods containing 6 percent, by weight, of mono-2,3-dibromopropyl acid phosphate were completely self-extinguished within 10 seconds; (2) the PMMA rods containing 6 percent, by weight, of a mixture containing mono- and di(2,3-dibromopropyl) acid phosphate in a 1:1 molar ratio were completely self-extinguished within 20 seconds; and, (3) the PMMA rods containing 6 percent, by weight, of di-(2,3-dibromopropyl) acid phosphate were not self-extinguishing. Rather, they continued to burn until they were completely consumed.

EXAMPLE II

This example illustrates the preparation of bis (2,3-dibromopropyl) acid pyrophosphate which, in turn, was used for the preparation of an equimolar mixture of mono- 2,3-dibromopropyl acid phosphate and 2,3-dibromopropyl methyl acid phosphate.

A reaction vessel containing 436 parts of 2,3-dibromopropanol was heated to a temperature of 50° C. whereupon 141 parts of phosphorus pentoxide were added gradually with stirring. The resulting mixture was stirred for 2 hours at 55°–60° C. until the solids had substantially disappeared. The bis (2,3-dibromopropyl) acid pyrophosphate thus produced was found by nuclear magnetic resonance to have a ratio of two acid protons per 10 aliphatic CH protons.

After heating the latter reaction product to 50°–70° C., 32 parts of methanol were added with stirring. This mixture was held at 70° C. for one-half hour. The nearly colorless syrup thus produced was found by means of nuclear magnetic resonance and titration analysis to correspond to a 1:1 molar mixture of mono-2,3-dibromopropyl acid phosphate and 2,3-dibromopropyl methyl acid phosphate. The latter esters were then separated for purposes of characterization by column chromatography on silica gel. The 2,3-dibromopropyl methyl acid phosphate was found to be a colorless solid having a neutralization equivalent of 326, and the 2,3-dibromopropyl acid phosphate was a colorless liquid having a neutralization equivalent of 312 to the strong acid end point.

EXAMPLE III

This example illustrates the preparation of additional fire retardant PMMA formulations according to the process of this invention and also offers a comparison between the thus prepared formulations and the results obtained by the use of a presently available phosphate ester additive.

A number of PMMA-phosphate ester formulations were prepared by means of a procedure similar to that of Example I, hereinabove, except that a partially polymerized polymethyl methacrylate-methylmethacrylate syrup was employed in place of unreacted MMA monomer. As a curing catalyst, 200 ppm azobisisobutyronitrile were added and the formulations were heated, at 80° C., in tubular molds until hardened. The composition of the thus prepared rods is set forth below.

Formulation No. 1—PMMA with 5%, by weight, of an equimolar mixture of mono-2,3-dibromopropyl acid phosphate and 2,3-dibromopropyl methyl acid phosphate; the latter phosphate ester mixture hereinafter being referred to as Mixture "A."

Formulation No. 2—PMMA with 13 percent, by weight, of Mixture "A."

Formulation No. 3—PMMA with 20%, by weight, of Mixture "A."

Formulation No. 4—PMMA with 5 percent, by weight, of mono-2,3-dibromopropyl acid phosphate.

Formulation No. 5—PMMA with 13 percent, by weight, of mono-2,3-dibromopropyl acid phosphate.

Formulation No. 6—PMMA with 20 percent, by weight, of mono-2,3-dibromopropyl acid phosphate.

Formulation No. 7—PMMA with 5 percent, by weight, of bis-(2,3-dibromopropyl) acid pyrophosphate.

Formulation No. 8—PMMA with 13 percent, by weight, of bis-(2,3-dibromopropyl) acid pyrophosphate.

Formulation No. 9—PMMA with 20 percent, by weight, of bis-(2,3-dibromopropyl) acid pyrophosphate.

Formulation No. 10—PMMA with 5 percent, by weight, of tris (2,3-dibromopropyl) phosphate; the latter ester being inapplicable for use in the process of this invention.

Formulation No. 11— PMMA with 13 percent, by weight, of tris (2,3-dibromopropyl) phosphate.

Formulation No. 12—PMMA with 20 percent, by weight, of tris (2,3dibromopropyl) phosphate.

The fire retardancy of these tubes was then quantitatively evaluated by determining their Limiting Oxygen Index (LOI) by means of the procedure described by Fenimore and Martin in the November, 1966, issue of Modern Plastics. In brief, this procedure directly relates flame retardancy to a measurement of the minimum percentage concentration of oxygen in a oxygen:nitrogen mixture which permits the sample to burn; the LOI being calculated as follows:

$$LOI = \left(\frac{[O_2]}{[O_2]+[N_2]}\right) \times 100$$

Thus, a higher LOI is indicative of a higher degree of flame retardancy.

The following table presents the results of this evaluation.

| Formulation No. | LOI (%) |
|---|---|
| 1 | 20.5 |
| 2 | 24.5 |
| 3 | 26.7 |
| 4 | 20.0 |
| 5 | 23.7 |
| 6 | 25.9 |
| 7 | 20.0 |
| 8 | 23.7 |
| 9 | 25.9 |
| 10 | 18.8 |
| 11 | 21.0 |
| 12 | 23.0 |

The above data clearly indicates that the PMMA blends containing the phosphate esters designated as applicable for use in the process of this invention, i.e., Formulations Nos. 1–9 display substantially superior flame retardancy as compared with the PMMA formulations, i.e., Formulations Nos. 10–12, which contained a phosphate ester, namely tris-(2,3-dibromopropyl) phosphate, which is not within the group of esters deemed suitable for use in this process. It is to be noted that the hardness and clarity of the rods made from Formulations Nos. 1–9 were comparable to that observed in a sample of unmodified PMMA sheeting.

EXAMPLE IV

This example illustrates the application of the process of this invention to a number of MMA copolymers.

Part A.

A 5 mil. sheet of clear hard polymer was obtained by heating the following formulation, at 80° C. in a mold for a period of 10 hours:

|  | Parts |
|---|---|
| mono-2,3-dibromopropyl acid phosphate | 15 |
| methyl methacrylate | 100 |
| ethyl acrylate | 10 |
| benzoyl peroxide | 0.02 |

This sheet was found to be self-extinguishing when evaluated by means of ASTM test D-635.

Part B.

A 5 mil. sheet of clear hard polymer was obtained by heating the following formulation for 2 hours at 70° C. and then for 5 hours at 100° C. while contained within a mold:

|  | Parts |
|---|---|
| an equimolar mixture of 2,3-dibromopropyl methyl acid phosphate and 2,3-dibromopropyl acid phosphate. | 10 |
| methyl methacrylate | 100 |
| 2-ethylhexyl acrylate | 5 |
| lauroyl peroxide | 0.05 |

The sheet was found to be self-extinguishing when evaluated by means of ASTM test D-635. Similar results were obtained by substituting cyclohexyl methacrylate and 2-ethylhexyl methacrylate, respectively, for the 2-ethylexyl acrylate in the above formulation.

EXAMPLE V

This example illustrates the preparation of additional products by means of the process of this invention.

Part A

To a mixture of 1.8 moles of methanol and 1.2 moles of redistilled 2,3-dibromopropanol, there was gradually added with stirring 1.0 mole of phosphorus pentoxide; the addition of the latter reagent being completed over a period of 45 minutes at 30°–40° C. The resulting mixture was then stirred at 70° C.

for 30 minutes so as to yield a mixed dibromopropyl methyl acid phosphate containing:
(a) at least about 30 mole percent of a mixture of mono-2,3-dibromopropyl acid phosphate and 2,3-dibromopropyl methyl acid phosphate together with
(b) a mixture of mono- and dimethyl acid phosphates and bis (2,3-dibromopropyl) acid phosphate. This mixture was in the form of a clear, substantially colorless liquid when used as a flame retardant additive for PMMA, the resulting plastic sheets were found to be colorless and were self-extinguishing in air at a concentration of 6.0 percent as based on the weight of the PMMA.

Part B

For comparative purposes, the above described reaction was run in the absence of methanol and with 3.0 rather than 1.2 moles of 2,3-dibromopropanol. This reaction yielded a mixture containing:
(a) at least about 50 mole percent of mono-2,3-dibromopropyl acid phosphate together with
(b) bis(2,3-dibromopropyl) acid phosphate. When used as a flame retardant additive for PMMA, the resulting plastic sheets were found to be colorless and were self-extinguishing in air at a concentration of 6.0 percent, as based on the weight of the PMMA.

Part C

In an evaluation of comparative flame retardant properties, a LOI of 25.7 percent was achieved by the use of a concentration of 16.7 percent, as based on the weight of PMMA, of an equimolar mixture of mono-2,3-dibromopropyl acid phosphate and 2,3-dibromopropyl methyl acid phosphate. In contrast, this same level of flame retardancy could be achieved only when a concentration of 47.2 percent by weight of PMMA, of di-n-butyl acid phosphate or of 41.8 percent, by weight of PMMA, of tris (2,3-dibromopropyl) phosphate were utilized. However, it is to be pointed out that the use in the above specified concentrations of the latter additives, neither of which is designated as being applicable for use in the subject process, yielded PMMA compositions which were too soft for commercial utilization.

EXAMPLE VI

To 1.0 mole of methanol and 2.0 moles of 2,3-dibromopropanol there was added 1.0 mole of phosphorus pentoxide. The admixture of these reagents was conducted with cooling over a period of 40 minutes at a temperature in the range of from 15°–48° C. and the mixture was then maintained for 1 hour at 70° C. so as to obtain a quantitative yield of a mixed reaction product.

Analysis of this mixed reaction product by means of solvent partition analysis involving water and benzene phases followed by nuclear magnetic resonance analysis of the fractions thereby obtained revealed that its composition was:

|  | Mole % |
|---|---|
| Mono-2,3-dibromopropyl acid phosphate | 25–30 |
| 2,3-dibromopropyl methyl acid phosphate | 25–30 |
| Mono-methyl acid phosphate | 20–25 |
| Bis(2,3-dibromopropyl) acid Phosphate | 20–25 |

When used as a flame retardant additive for PMMA, the resulting plastic sheets were found to be colorless and were self-extinguishing in air at a concentration of 6.0 percent as based on the weight of the PMMA.

Variations may be made in proportions, procedures and materials without departing from the scope of this invention as defined in the following claims.

What is claimed is:

1. A flame retardant composition comprising an intimate mixture of a polymer of methyl methacrylate and as a flame retardant additive a mixture of mono-2,3-dibromopropyl acid phosphate and 2,3-dibromopropyl methyl acid phosphate.

2. A flame retardant composition comprising an intimate mixture of a polymer of methyl methacrylate and as a flame retardant additive bis(2,3-dibromopropyl acid pyrophosphate.

3. A flame retardant composition comprising an intimate mixture of a polymer of methyl methacrylate and as a flame retardant additive 2,3-dibromopropyl methyl acid phosphate.

4. A flame retardant composition comprising an intimate mixture of a polymer of methyl methacrylate and as a flame retardant additive (a) a mixture of mono-2,3-dibromopropyl acid phosphate and 2,3-dibromopropyl methyl acid phosphate, said mixture comprising at least about 30 mole percent of said additive with the balance of said additive comprising (b) a mixture of mono- and dimethyl acid phosphate and bis(2,3-dibromopropyl) acid phosphate; said additive comprising the product resulting from the reaction between about 1.8 moles of methanol, about 1.2 moles of 2,3-dibromopropanol and about 1.0 mole of phosphorus pentoxide.

5. A flame retardant composition comprising an intimate mixture of a polymer of methyl methacrylate and as a flame retardant additive a mixture of: (a) mono-2,3-dibromopropyl acid phosphate (b) 2,3-dibromopropyl methyl acid phosphate (c) mono-methyl acid phosphate and (d) bis(2,3-dibromopropyl) acid phosphate said mixture being the product resulting from the reaction between about 1.0 mole of methanol, about 2.0 moles of 2,3-dibromopropanol and about 1.0 mole of phosphorus pentoxide.

* * * * *